INVENTOR
YOSHIAKI ENDO
BY Roy C. Hopgood
ATTORNEY

PARAMETRIC STORAGE ELEMENT FOR DIGITAL COMPUTERS

Filed Oct. 16, 1961 2 Sheets-Sheet 2

INVENTOR
YOSHIAKI ENDO
BY Roy C. Hopgood
ATTORNEY

United States Patent Office 3,119,024
Patented Jan. 21, 1964

3,119,024

PARAMETRIC STORAGE ELEMENT FOR DIGITAL COMPUTERS

Yoshiaki Endo, Tokyo, Japan, assignor to Nippon Electric Company Limited, Tokyo, Japan, a corporation of Japan Filed Oct. 16, 1961, Ser. No. 145,035
5 Claims. (Cl. 307—88)

This invention relates in general to parametric storage elements, which will hereinafter be called parametrons, and in particular to an improved parametron which eliminates undesired feedback in cascaded parametron circuits such as used in digital computers or the like. The invention is characterized by a saturable reactor in the information input circuit of the parametron and by switching means adapted to saturate said reactor at predetermined times in the operating cycle of the parametron to eliminate feedback signals without interfering with the normal information input signals thereto.

Parametrons, which were invented in 1954 by Eiichi Goto, are digital computer elements which utilize the phenomena of parametric oscillations to store and to process binary information, which is represented by the phase angle of the parametric oscillations. The parametron circuit is basically a resonant circuit which contains a variable reactive element, which can be either a variable inductance or a variable capacitance. When the variable reactive element is pumped, or varied, at twice the resonant frequency of the circuit, the circuit will oscillate at its resonant frequency in either of two stable phases, which can be selected by a small control or information input signal applied to the resonant circuit in the early stages of its oscillation. In digital computer circuits, these parametrons are often connected in cascade, with the output signal of one parametron serving as the control input signal of the next parametron, and with the parametrons being switched in overlapping time sequence to transfer information in a predetermined direction along the cascade circuit.

It has been found, however, that undesired feed-back signals will be developed in some cascaded parametron circuits, thereby transferring information in the backward direction when the parametrons are switched as well as in the forward direction. In this case a parametron may receive two control input signals; one from the forward direction of information transfer, and one from the backward or feedback direction. When the feedback signal is strong enough, as it is in many cases, it will overcome the forward control signal and produce a false phase of oscillation in the parametron. This, of course, produces an error in the results of the computation or logical operation performed by the cascade circuit.

Accordingly, one object of this invention is to provide an improved parametron which is adapted to eliminate undesired feedback signals without interfering with normal input signals.

Another object of this invention is to provide an improved parametron cascade circuit which eliminates the transfer of information in the backward direction therealong without interfering with the transfer of information in the forward direction therealong.

A further object of this invention is to provide improved parametrons and improved logical circuits therefor which are more reliable in operation than those heretofore known in the art and less subject to error.

Other objects and advantages of the invention will become apparent to those skilled in the art from the following description of one specific embodiment of the invention, as illustrated in the attached drawings, in which.

Figure 1:
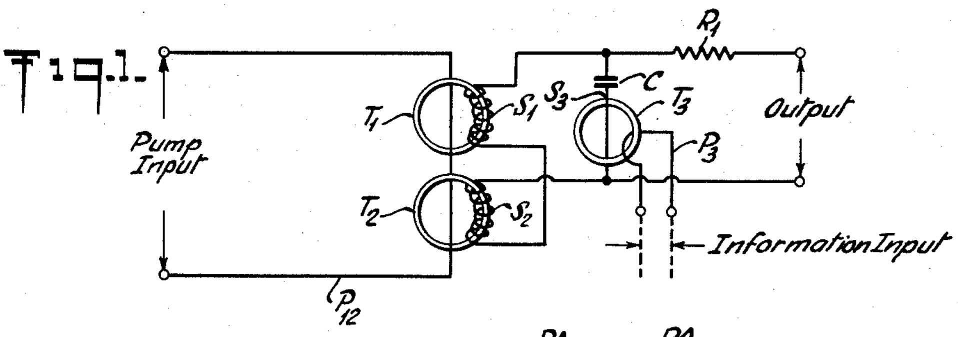
FIG. 1 is a schematic circuit diagram of a prior art parametron.

FIG. 1 shows a prior art parametron which utilizes a variable inductance to produce parametric oscillations. The variable inductance comprises the secondary windings $S_1$ and $S_2$ of two saturable transformers $T_1$ and $T_2$ which are driven by a common primary winding $P_{12}$. Secondary windings $S_1$ and $S_2$ are coupled in series opposition with each other, for reasons discussed below, to form a composite inductance which is coupled to a capacitor C to form a tuned circuit which resonates at a frequency F. In accordance with well known parametric oscillator principles, this circuit will oscillate at its resonant frequency if the composite inductance thereof is varied (pumped) at twice the resonant frequency of the circuit.

This particular parametron is pumped by applying an A.C. pump input current which is superimposed on a D.C. bias level. The D.C. bias level is selected to initially bias the cores of transformers $T_1$ and $T_2$ to non-linear portion of their hysteresis curve, and the A.C. pump current then changes the inductance of the secondary windings by varying the magnetic flux in the cores above and below the initial bias point. The A.C. pump current, of course, has a frequency of 2F, but this frequency is cancelled out in the secondary windings $S_1$ and $S_2$ because they are connected in series opposition. Thus the net effect of the pump input signal is to vary the composite inductance at a frequency of 2F, which induces oscillation of the tuned circuit at its resonant frequency F.

The parametrically induced oscillations of the tuned circuit are stable in either of two phases which are separated from each other by exactly 180 degrees of phase angle. These two phases are customarily designated as the 0 phase and $\pi$ phase of oscillation, and in digital computer circuits one phase is used to indicate a binary 0 and the other phase to indicate a binary. Although the resonant circuit is quite stable in phase after it has reached its full amplitude of oscillation, the phase can be controlled by a relatively weak input signal when the circuit is initially excited by the pump input. Therefore the 0 or $\pi$ phase of oscillation can be selected by a small control input signal which is coupled to the resonant circuit by a control input transformer $T_3$ when the pump input is switched on. The selected phase of oscillation will then persist as long as the pump input signal is applied, which means that the circuit will store the information that was present on its control input at the start of oscillation. This information can be extracted from the circuit at any time by taking an output signal across capacitor C via a coupling resistor $R_1$, which is selected to critically damp the resonant circuit so that its oscillation will cease shortly after the pump input signal is disconnected. It can be seen, then, that the parametron per se is basically a bi-stable information storage element. (The basic parametron can be altered for tri-stable operation, i.e. it can be adapted to produce 0 phase oscillations, $\pi$ phase oscillations, or no oscillations, but this adaptation will not be discussed herein because the feedback problem only arises in the two oscillatory modes of operation.)

Figure 4:
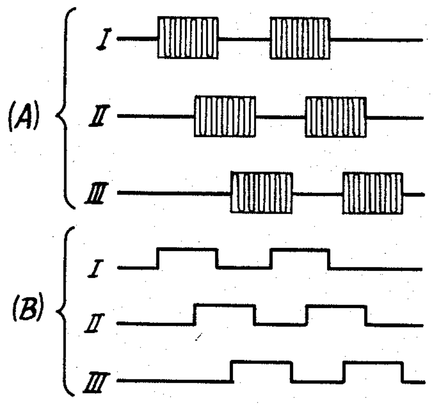
FIG. 4 is a set of waveforms illustrating a three beat parametron excitation cycle such as used in the prior art and a corresponding three beat input switching cycle such as used in this invention to eliminate feedback.

In digital computers, the parametrons described above are often connected in cascade, with the output terminals of one parametron coupled to the control input terminals of the next, whereby the information contained in one parametron can be transferred to the next in line at predetermined times in the computer cycle. Since the parametron can only receive information at the beginning of its pump excitation cycle, it is therefore, necessary to excite adjacent parametrons in such manner that their operating times overlap, whereby the output of one parametron is present on the information input of the next parametron when it is first excited. This has been done in the past by providing three overlapping groups of excitation pulses as shown in the waveforms of FIG. 4A, which illustrate the pump input signals for a three beat excitation cycle such as used in prior art cascaded parametron circuits. The A.C. pump signals shown in these waveforms are derived from a common pump source, but they are switched at different overlapping time periods to define three different groups of excitation waves. These excitation groups are usually designated at the I, II, and III excitation groups, and in cascaded parametrons it is necessary to follow a I—II—III—I—II—III connection in order to transfer information down the cascade chain. This can be verified by noting in FG. 4A that a parametron which is pumped by the group I excitation signals can only receive a control input signal from a parametron which is pumped by the group III excitation signals, and it can only apply its output signal to a parametron which is pumped by the group II excitation signals. Similar limitations will be apparent to those skilled in the art for the case of parametrons which are pumped by the group II and III excitation signals.

Figure 2:
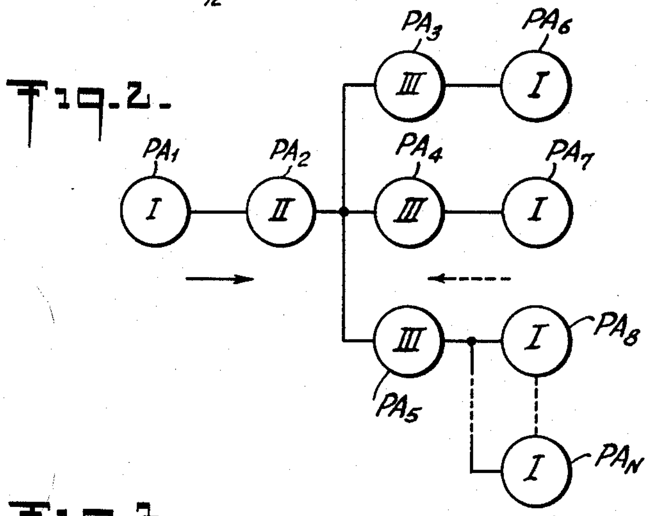
FIG. 2 is a block diagram of a cascaded parametron circuit in which feedback is an important factor.

FIG. 2 shows a cascade parametron circuit such as described above. Each circle in the drawing indicates a parametron PA and the Roman numeral within the circle indicates the pump excitation group for the corresponding parametron. The solid line indicates a connection from the output terminals of the left hand parametron to the information input terminals of the right hand parametron. The pump connections are not shown, but it will be apparent to those skilled in the art that each parametron marked with the same Roman numeral is connected to the corresponding group of excitation signals as shown in FIG. 4A. In this cascade circuit, information is normally transferred from left to right, as indicated by the solid arrow, but with the prior art parametrons an information feedback signal is also developed which transfers information from right to left, as indicated by the dotted arrow. Assume, for example, that parametron $PA_1$ receives a 0 phase control input signal on the first excitation cycle of the group I excitation signals. $PA_1$ will then oscillate in its 0 phase in its first excitation cycle, and this 0 phase will be transferred down the cascade circuit until it reaches parametrons $PA_6 \ldots PA_N$, which are also pumped by the group I excitation signals. Assume further that a $\pi$ phase input signal is applied to parametron $PA_1$ at the start of the group I excitation cycle which transfers the 0 phase signal into parametrons $PA_6 \ldots PA_N$. In this case, $PA_1$ would be oscillating in the $\pi$ phase while at the same time $PA_6 \ldots PA_N$ would be oscillating in the 0 phase. All of the other parametrons would be quiescent until the start of the next group II excitation cycle, at which time the $\pi$ phase of parametron $PA_1$ would theoretically be transferred to parametron $PA_2$.

From the circuit of FIG. 1, however, it will be apparent that the 0 phase of oscillation will be coupled in the backward direction from the input terminals of parametrons $PA_6 \ldots PA_N$ to the output terminals of parametron $PA_2$. Therefore, in the particular group I excitation cycle noted above, parametron $PA_2$ will have a $\pi$ phase signal applied to its information input terminals from the forward direction and a 0 phase signal applied to its output terminals from the backward direction. If there are enough parametrons in the group $PA_6 \ldots PA_N$, the 0 phase feedback signal will be stronger than the $\pi$ phase input signal, and parametron $PA_2$ will erroneously select the 0 phase of oscillation at the start of the next group II excitation cycle. This error, of course, will be transferred down the cascade circuit, and additional errors will be generated in parametron $PA_2$ on every group I excitation cycle where the phase of parametron $PA_1$ differs from the phase of parametrons $PA_6 \ldots Pa_N$.

Figure 3:
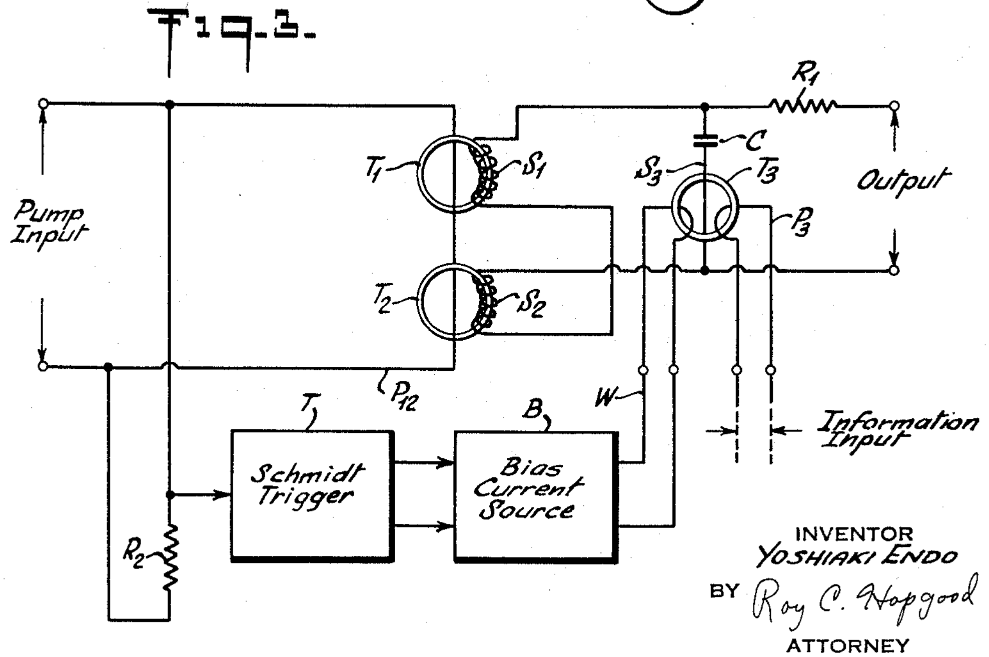
FIG. 3 is a schematic circuit diagram of one illustrative improved parametron of this invention.

In accordance with this invention, however, the above described feedback can be entirely eliminated by using an improved parametron circuit such as shown in FIG. 3 of the drawings. This improved parametron circuit is similar to the prior art parametron circuits, but it includes a bias winding W on the core of transformer $T_3$ and a bias switching circuit for energizing the bias winding in synchronism with the pump input signal to the parametron. In this particular embodiment, the bias switching source is shown to comprise a bias current source B and a Schmidt trigger T which is adapted to switch the bias current source off and on. The output of the bias current source is set at a level which will saturate the core of transformer $T_3$ and thus reduce its coefficient of coupling to a very low level to effectively remove the transformer from the circuit. When the core of transformer $T_3$ is saturated, the transfer of signals between the primary and secondary winding thereof is reduced to an insignificant level.

Schmidt trigger T is adapted to switch to its On state in response to the D.C. component of the pump input signal and to return to its Off state when the pump input signal is removed. Bias current source B is adapted to switch On in response to the On state of Schmidt trigger T and to switch Off in response to the Off state thereof. Due to the switching delays in these two circuits, however, the bias current pulse will lag the pump input by enough time to allow the information input signal to be effective when the pump input is first applied. This assures that the input information will be transferred into the circuit at the start of the excitation cycle. But after this short delay, transformer $T_3$ becomes saturated by the bias current pulse and it remains saturated during the rest of the excitation cycle. This eliminates all coupling across the transformer, which blocks all feedback signals but does not block the output signal. Thus the output signal will be present on the information input terminals of the next parametron, and it will be transferred into the next parametron at the start of its next pump input signal.

It can be seen, then, that the novel parametron circuit of this invention eliminates the feedback signal without interfering with the normal information signals, thereby eliminating the above described errors which otherwise arise in the cascade circuit of FIG. 2 and in other similar circuits. Furthermore, the elimination of feedback signals allows parametron cascade circuits to be driven by a two beat excitation cycle, as shown in FIG. 6A, instead of requiring a three beat excitation cycle as shown in FIG. 4A. In a two beat excitation cycle, errors will usually be developed in a simple cascade chain of parametrons due to the increased strength of the feedback signal which results from placing the feedback source directly adjacent to the parametron it effects. Therefore the three beat excitation has been used in the past to reduce the feedback signal by placing one buffer stage between the feedback source and the parametron it effects. With the novel parametron circuit of this invention, however, the feedback is effectively eliminated, whereby a two beat excitation cycle can be used without any possibility of error. Thus in addition to allowing many parallel branches to be used in a three beat excitation system, this invention also allows the three beat excitation system to be replaced by a two beat excitation system, which provides a significant simplification in the computer circuits and a corresponding increase in reliability, economy, and efficiency.

Figure 5:
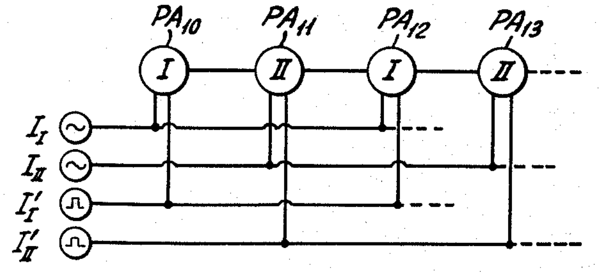
FIG. 5 is a block diagram of a cascaded parametron circuit of this invention which is adapted to operate on a two beat excitation and input switching cycle.
Figure 6:
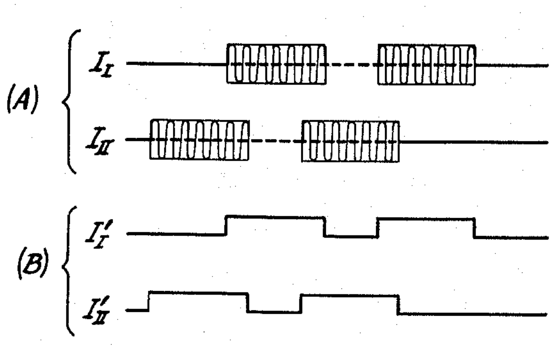
FIG. 6 is a set of waveforms illustrating a two beat parametron excitation cycle and a corresponding two beat input switching cycle such as used in this invention to eliminate feedback.

FIGS. 5 and 6 show one illustrative two beat excitation system which can be formed from the novel parametron of this invention. Parametrons $PA_{10}$ . . . $PA_{13}$ are shown coupled together in a simple cascade chain where the horizontal lines between parametrons indicate a coupling from the output terminals of the left hand parametron to the information input terminals of the right hand parametron. Each of the group I parametrons is excited by a common pump $I_I$ and switched by a common bias current source $I'_I$, which operates in synchronism with the pump as shown in the waveforms of FIG. 6. The group II parametrons are similarly excited by pump $I_{II}$ and bias current source $I'_{II}$. These bias current sources can be switched by a Schmidt trigger, as shown in FIG. 3, or by any other suitable switching circuit which provides an adequate delay between the start of the pump excitation cycle and the start of the bias pulse. Any desired number of parametrons can be added to the cascade chain, but the output level of the pumps and the bias current sources would, of course, have to be adequate to drive and to control all of the parametrons in the chain.

From the foregoing description it will be apparent that this invention provides an improved parametron which is adapted to eliminate undesired feedback signals without interfering with normal input signals. It will also be apparent that this invention provides an improved parametron cascade circuit which eliminates the transfer of information in the backward direction therealong without interfering with the transfer of information in the forward direction therealong. And it should be understood that this invention is by no means limited to the specific structures disclosed herein by way of example, since many modifications can be made in the structure disclosed without departing from the basic teaching of this application. For example, although the parametron is shown to have a variable inductance element, it could just as well have a variable capacitance element without changing its fundamental principle of operation or the elements added in accordance with this invention. In addition, many other suitable switching circuits can be used in place of the Schmidt trigger disclosed herein. These and many other modifications will be apparent to those skilled in the art, and this invention includes all modifications falling within the scope of the following claims.

I claim:

1. A parametron comprising a resonant circuit containing a variable reactive element, pump input means coupled to said variable reactive element, said pump input means being adapted to receive a pump input signal operable to vary said variable reactive element at twice the nominal resonant frequency of said resonant circuit, an information input transformer coupled to said resonant circuit, said information input transformer having a saturable core with primary, secondary, and control windings thereon, said secondary winding being coupled to said resonant circuit, said primary winding being adapted to receive an information input signal, said control winding being coupled to a bias source adapted to saturate said core when energized, and switch means coupled between said bias source and said pump input means, said switch means being adapted to energize said bias source in response to a pump input signal to said pump input means and to de-energize said bias source in response to the absence of a pump input signal to said pump input means, and output means coupled to said resonant circuit.

2. The combination defined in claim 1 wherein said switch means is adapted to delay the energization of said bias source to produce a time lag between the application of said pump input signal and the saturation of said information input transformer, whereby said information input transformer remains unsaturated for a short time following the application of said pump input signal.

3. The combination defined in claim 2 wherein said time lag is longer than the minimum time required for said resonant circuit to reach a stable and phase angle of oscillation following the application of a pump input signal.

4. A parametron comprising a resonant circuit containing a variable reactive element, the reactance of said variable reactive element being variable in response to electrical signals applied thereto, pump means coupled to said variable reactive element, said pump means being operable to produce a pump signal adapted to vary the reactance of said variable reactive element at twice the nominal resonant frequency of said tuned circuit, thereby inducing parametric oscillations in said resonant circuit at said nominal resonant frequency thereof, said parametric oscillations being stable in either of two different phase angles with respect to the phase of said pump signal, and the phase angle of said parametric oscillations being controllable by an information input signal coupled to said resonant circuit in the time interval immediately following the application of a pump signal to the variable reactive element thereof, an information input transformer having a saturable core with primary, secondary, and control windings thereon, said secondary winding being coupled to said resonant circuit, said primary winding being adapted to receive an information input signal, said control winding being coupled to a bias source adapted to saturate said core when energized, switch means coupled between said bias source and said pump means, said switch means being adapted to energize said bias source in synchronism with said pump signal, said switch means being adapted to delay the energization of said bias source to produce a time lag between the application of said pump input signal and the saturation of said information input transformer, said time lag being longer than the minimum time required for said resonant circuit to reach a stable phase angle of parametric oscillation following the application of a pump input signal, and output means coupled to said resonant circuit.

5. A parametron cascade circuit comprising an ordered plurality of parametrons as defined in claim 4, said parametrons being coupled together in a cascade sequence $P_1$ . . . $P_N$ with the output means of each parametron except $P_N$ coupled to the primary winding of the information input transformer of the next parametron in the sequence, the pump means of said parametrons being adapted to produce periodic pump signals, and the pump means of each parametron being adapted to produce a pump signal which begins before the pump signal of the preceding parametron has terminated and terminates after the pump signal of the following parametron has begun.

No references cited.